US010849318B2

(12) United States Patent
Baker

(10) Patent No.: US 10,849,318 B2
(45) Date of Patent: Dec. 1, 2020

(54) HEATED FISHING REEL

(71) Applicant: Austin Baker, Calabasas, CA (US)

(72) Inventor: Austin Baker, Calabasas, CA (US)

(*) Notice: Subject to any disclaimer, the term of this patent is extended or adjusted under 35 U.S.C. 154(b) by 0 days.

(21) Appl. No.: 16/796,419

(22) Filed: Feb. 20, 2020

(65) Prior Publication Data
US 2020/0267955 A1    Aug. 27, 2020

Related U.S. Application Data

(60) Provisional application No. 62/809,549, filed on Feb. 22, 2019, provisional application No. 62/809,665, filed on Feb. 24, 2019, provisional application No. 62/929,842, filed on Nov. 2, 2019, provisional application No. 62/933,314, filed on Nov. 8, 2019, provisional application No. 62/937,007, filed on Nov. 18, 2019.

(51) Int. Cl.
*A01K 89/01* (2006.01)
*A01K 89/00* (2006.01)

(52) U.S. Cl.
CPC .................................. *A01K 89/00* (2013.01)

(58) Field of Classification Search
CPC ............ A01K 89/006; A01K 89/01121; A01K 89/01127; A01K 89/016; A01K 89/0192; A01K 89/01925
See application file for complete search history.

(56) References Cited

U.S. PATENT DOCUMENTS

| | | | | |
|---|---|---|---|---|
| 1,865,834 A | | 7/1932 | Claridge | |
| 2,816,539 A | * | 12/1957 | Church | A01K 87/085 126/208 |
| 3,089,663 A | | 5/1963 | Kirby | |
| 3,993,267 A | * | 11/1976 | Murvall | A01K 89/018 242/270 |
| 4,945,668 A | * | 8/1990 | Keller | A01K 97/01 43/17 |
| 5,517,786 A | * | 5/1996 | Peissig | A01K 87/085 43/18.1 R |
| 5,598,656 A | * | 2/1997 | Strasser | A01K 97/01 43/17 |
| 5,655,328 A | * | 8/1997 | Childs | A01K 87/085 219/535 |
| 5,655,628 A | | 8/1997 | Lin | |

(Continued)

OTHER PUBLICATIONS

PCT/US2020/019070 International Search Report and Written Opinion, dated May 28, 2020.

*Primary Examiner* — Emmanuel M Marcelo
(74) *Attorney, Agent, or Firm* — Erise IP, P.A.

(57) ABSTRACT

A heated fishing reel, a system for heating a fishing reel, and a heated handle assembly provide a means of warming the hands of a user. The heated fishing reel comprises a reel casing, a handle, a side plate, a power source disposed in the fishing reel to provide power for a heating element disposed within one of a reel casing of the fishing reel or a side plate of the fishing reel. The system for heating the fishing reel comprises a plurality of heating elements and a power source disposed in the fishing reel for providing power to the plurality of heating elements. The heated handle assembly comprises a rocker arm, a knob attached to a distal end of the rocker arm, a heating element disposed in the knob, and a power source mounted in the knob for heating the knob.

20 Claims, 10 Drawing Sheets

(56) References Cited

U.S. PATENT DOCUMENTS

| | | | | |
|---|---|---|---|---|
| 5,934,587 | A * | 8/1999 | Yamaguchi | A01K 89/006 |
| | | | | 242/283 |
| 6,045,076 | A * | 4/2000 | Daniels | A01K 89/01555 |
| | | | | 188/268 |
| 10,524,460 | B1 * | 1/2020 | Konitzer | A01K 91/065 |
| 2008/0272103 | A1 * | 11/2008 | Farrington | A01K 27/003 |
| | | | | 219/201 |
| 2008/0272104 | A1 * | 11/2008 | Farrington | A63B 53/14 |
| | | | | 219/201 |
| 2009/0241403 | A1 * | 10/2009 | Foss | A01K 97/01 |
| | | | | 43/4.5 |
| 2010/0000143 | A1 * | 1/2010 | Pekin | A01K 89/00 |
| | | | | 43/17 |
| 2013/0092206 | A1 * | 4/2013 | Tayebi | A45B 11/02 |
| | | | | 135/98 |
| 2014/0131128 | A1 * | 5/2014 | Schuhmacher | B62J 17/02 |
| | | | | 180/219 |
| 2017/0325439 | A1 * | 11/2017 | Chapman | A01K 87/085 |

* cited by examiner ial of heating elements disposed within the reel to heat the reel and thereby heat a user's hands.

HEATED FISHING REEL

RELATED APPLICATIONS

This non-provisional patent application claims priority benefit, with regard to all common subject matter, of earlier-filed U.S. Provisional Patent Application No. 62/809,549 filed Feb. 22, 2019 and entitled HEATED FISHING REEL; earlier-filed U.S. Provisional Patent Application No. 62/809,665 filed Feb. 24, 2019 and entitled DEVICE FOR ELECTRONICALLY HEATING A CASTING-STYLE FISHING REEL; earlier-filed U.S. Provisional Patent Application No. 62/929,842 filed Nov. 2, 2019 and entitled HEATED FISHING REEL; earlier-filed U.S. Provisional Patent Application No. 62/933,314 filed Nov. 8, 2019 and entitled FISHING REEL WITH FOAM CASING; and earlier-filed U.S. Provisional Patent Application No. 62/937,007 filed Nov. 18, 2019 and entitled HEATED FISHING REEL HANDLE. The identified earlier-filed provisional patent applications are hereby incorporated by reference in their entirety into the present application.

BACKGROUND

1. Field

Embodiments of the invention relate to fishing reels. More specifically, embodiments of the invention relate to electrically heated fishing reels.

2. Related Art

Cold hands are a significant problem for fishermen when fishing in cold weather. Fishing with a baitcasting-style reel often involves a user placing both hands on the reel while fishing in order to control the reel and cast. The material of the reel is often metal or some other type of thermally conductive material. Accordingly, when fishing in cold weather, the material of the reel becomes cold and leads to discomfort, as the user's hands also become cold. Existing solutions for preventing a fisherman from getting cold hands while fishing in cold weather are unsatisfactory. Some of these solutions attempt to fight the cold weather by warming the user's hands by means of covering the user's hands with some type of material. Typical solutions include: wearing gloves, heat inserts, and electrically heated gloves. These solutions are unsatisfactory because the resulting lack of sensitivity results in decreased success in catching fish, and users prefer sensitivity to maintain performance. As such, it is desirable that nothing come in between the user's hands and the reel. Further, covering the user's hands with material does not address the problem of the cold hard material that the user must rest their hands on when fishing a baitcasting-style fishing reel. The cold hard material of the reel will ultimately penetrate whatever material is used to keep the user's hands warm over the course of and extended fishing session, unless it is extremely bulky. Further, as an additional problem specific to fishing, when the material used to cover the user's hands becomes wet, the material is rendered insufficient for its purpose of keeping the user's hands warm. Further still, sufficiently warm materials complicate the user's ability to control the cast using a baitcasting reel as a result of their bulkiness.

Other solutions to the problem of cold hands while fishing attempt to warm the user's hands by heating the fishing rod. However, heating the rod fails to meet users' needs because the user often grasps the reel itself instead of the pole, particularly when fishing a baitcasting style reel.

Finally, different rods are used to fish in different specific scenarios. Thus, incorporating a feature into a rod would greatly increase cost, as the feature would need to be incorporated into each rod to be used.

SUMMARY

Embodiments of the invention solve the above-mentioned problems by providing a heated fishing reel. In particular, in some embodiments, the system uses a power source to power a plurality of heating elements disposed within a fishing reel to thereby heat specific portions of the fishing reel in contact with the hands of the user, and thereby heat the hands of a user.

A first embodiment of the invention is directed to a heated fishing reel configured to be attached to a fishing rod, the heated fishing reel comprising a reel casing including a thumb bar, a finger bar, and a gear housing, a spool for winding fishing line, a handle rotatably attached to the reel casing adjacent to the gear housing for rotating the spool, a side plate selectively attached to the reel casing, a plurality of heating elements comprising a first heating element disposed in the thumb bar of the reel casing for heating the thumb bar, a second heating element disposed in the finger bar of the reel casing for heating the finger bar, a third heating element disposed in the reel casing adjacent to the gear housing, and a fourth heating element disposed in the side plate for heating the side plate, and a power source disposed in the side plate for providing power to the plurality of heating elements.

A second embodiment of the invention is directed to a system for heating a fishing reel, the system comprising a plurality of heating elements disposed in said fishing reel for heating said fishing reel, wherein the fishing reel comprises a spool for winding fishing line, a reel casing attached to the spool, at least one side plate attached to the reel casing, and a handle for rotating the spool, wherein the plurality of heating elements comprises a first heating element disposed in the reel casing, a second heating element disposed in the at least one side plate, and a third heating element disposed in the handle, and a power source attached to the reel casing of said fishing reel, wherein the power source provides power to the plurality of heating elements.

A third embodiment of the invention is directed to a heated fishing reel assembly configured to be attached to a fishing rod, the assembly comprising a reel casing, a spool for winding fishing line, and a heated handle assembly comprising a rocker arm configured to be rotatably attached to the reel casing, wherein the rocker arm is coupled to the spool, at least one knob rotatably attached to a distal end of the rocker arm, a heating element disposed in the at least one knob, and a rechargeable power source mounted in the at least one knob, wherein the power source is configured to provide power to the heating element.

A fourth embodiment of the invention is directed to a heated handle assembly for a fishing reel, the assembly comprising a rocker arm configured to be rotatably attached to said fishing reel, at least one knob rotatably attached to a distal end of the rocker arm, a heating element disposed in the at least one knob, and a rechargeable power source mounted in the at least one knob, wherein the power source is configured to provide power to the heating element.

A fifth embodiment of the invention is directed to a heated spinning-style reel comprising a power source and a plurality of heating elements disposed within the spinning-style reel to thereby provide heating to the hands of a user.

A sixth embodiment of the invention is directed to a system for supplying electrical power from a power source to at least one heating element of a heated fishing reel through a rotating joint using at least one slip ring.

A seventh embodiment of the invention is directed to a fluid heating system for heating a fishing reel, the fluid heating system comprising a plurality of fluid channels, a fluid circulated through the fluid channels, and a heat source for heating the fluid.

Additional embodiments of the invention are directed to a heated fishing reel configured to be attached to a fishing rod, the heated fishing reel comprising a reel casing, a handle rotatably attached to the reel casing, a side plate selectively attached to the reel casing, and at least one chemical heat source for heating the fishing reel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
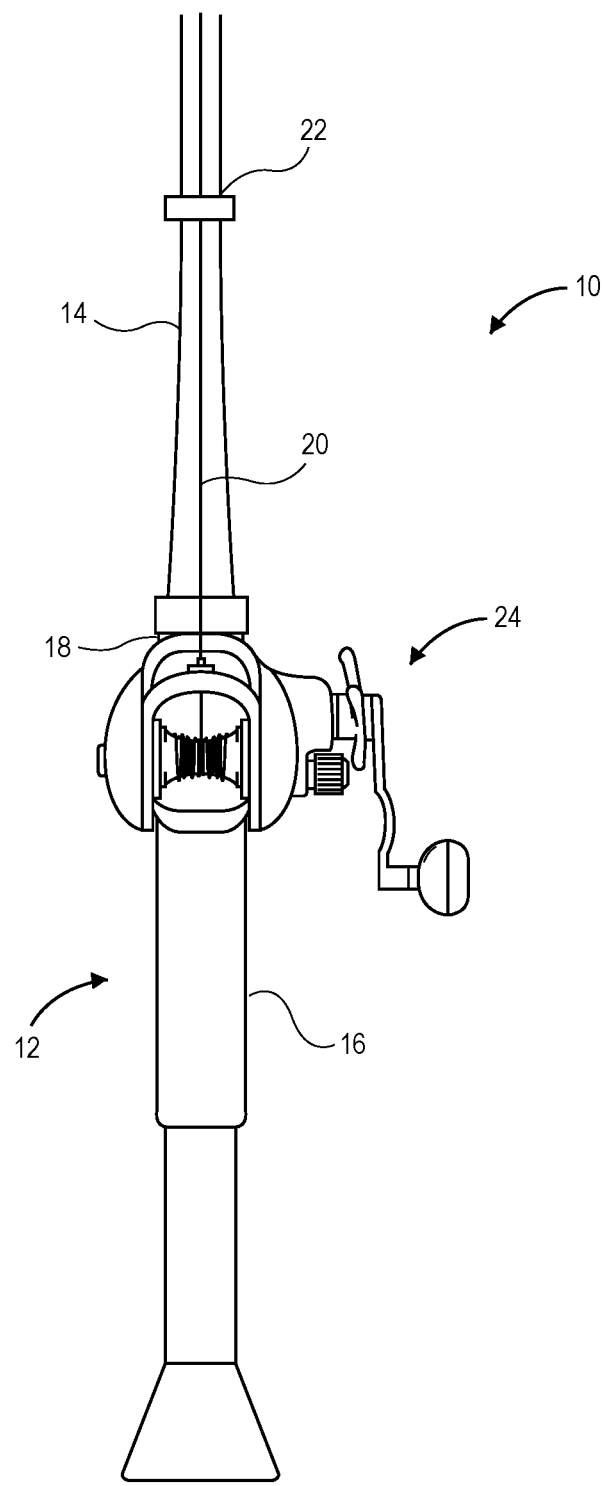
FIG. 1 is an embodiment of a reel and rod assembly.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In this description, references to "baitcasting-style reel," refer to casting-style reels that may be known in the art as "bait-caster", "conventional", or "level-wind" reels. Typically, a baitcasting-style reel is attached above a fishing rod. Baitcasting-style reels are distinct from spinning-style reels. In this description, references to "spinning-style reel," refer to spinning-style reels that are attached below a fishing rod. A POSITA will understand the distinctions between the uses and construction of these types of reel. In particular, in a baitcasting reel, a spool of the reel rotates about an axis to wind line as a line guide moves parallel to that axis to layer the line evenly on the spool. By contrast, in a spinner-style reel, the line guide rotates about the axis of the spool to wind line as the spool moves parallel to the axis to layer line evenly on the spool. Each of these styles of reel has advantages and disadvantages; however, in the context of the below-disclosed invention, it is important to note that, when retrieving, the fisherman grips a baitcasting assembly by the reel itself and grips a spinning assembly by the rod.

FIG. 1 depicts a reel and rod assembly 10 comprising a reel assembly 24 and a rod assembly 12. In some embodiments, the reel assembly 24 may be removably attached to the rod assembly 12 such that various reel assemblies are interchangeable with various rod assemblies. In some embodiments, the reel assembly 24 is preferably a baitcasting style reel, as shown in FIGS. 1, 2A-2C, and FIG. 5. The rod assembly 12 comprises a rod 14, a grip 16, a reel seat 18, a line 20, and at least one eye 22 attached to the rod 14. The rod 14 is preferably tapered and extends outward from the grip 16 by which a user may hold the rod assembly 12. The line 20 may be configured to run through the at least one eye 22. Typically, the line 20 passes through a plurality of eyes that decrease in diameter down the length of the rod 14, not shown.

Figure 2A:
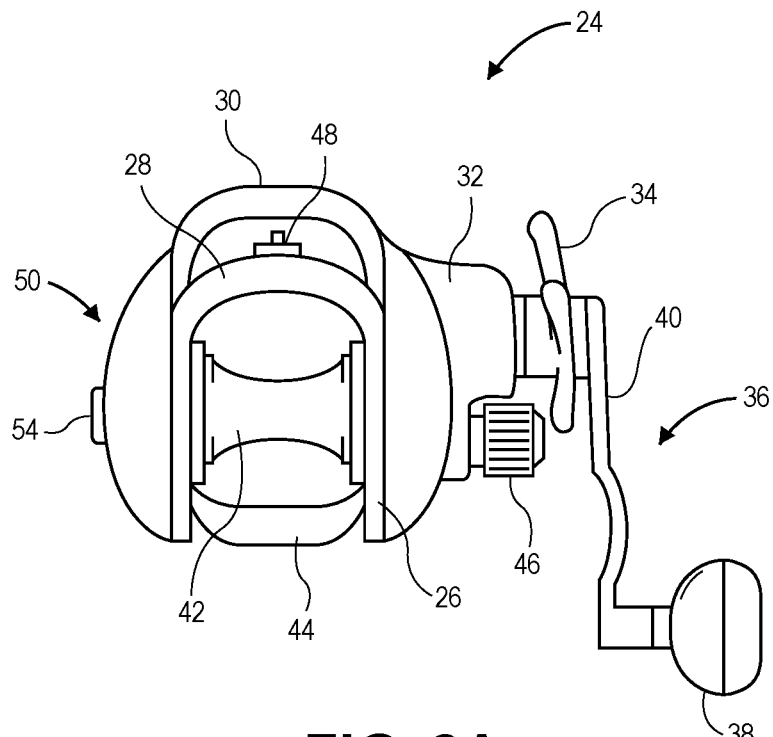
FIG. 2A is an embodiment of the reel assembly presented in FIG. 1.

FIG. 2A shows the reel assembly 24 removed from the rod assembly 12. In some embodiments, the reel assembly 24 comprises a reel casing 26 including a thumb bar 28, a finger bar 30, and a gear housing 32, a drag adjustment star 34, a handle assembly 36 including at least one knob 38 and a rocker arm 40, a spool 42, a spool release button 44, a spool tension knob 46, a line guide 48, and a side plate 50 including a power source 52 (as shown in FIG. 2C) and a brake 54. In some embodiments, the side plate 50 comprises a left side plate and a right side plate disposed on either side of the reel casing 26. The line 20 of FIG. 1 may be wound around the spool 42 and drawn through the line guide 48. During fishing operations, such as retrieving, the user may place both hands on the reel assembly 24. It may be desirable that the user place one hand on the side plate 50 with a thumb resting on the thumb bar 28 and at least one finger resting on the finger bar 30. The second hand of the user may grip the knob 38 of the handle assembly 36 to perform a winding operation.

In various embodiments, any of the components of the reel assembly 24 may be heated. For example, the side plate 50, the reel casing 26, the knob 38, the spool release button 44, and the line guide 48 may be heated. In some embodiments, the reel assembly 24 further comprises a plurality of heating elements disposed at various locations to provide heating to the reel assembly 24. For example, heating elements may be positioned beneath the surface of the reel where the user's hands are positioned to control the cast or to retrieve the cast. In some embodiments, the heating elements may be disposed in at least one of the reel casing 26, the side plate 50, and the handle assembly 36. In some embodiments, the position of the heating elements may be selected based on a position of the user's hands. The position of the user's hands may be associated with a specific fishing operation, such as, casting or retrieving. For example, when retrieving a user may place one hand in contact with the side plate 50 and the reel casing 26 and place the other hand in contact with the knob 38 of the handle assembly 36. Accordingly, the side plate 50, reel casing 26, and knob 38 may include heating elements disposed therein. In some embodiments, at least a portion of the reel casing 26 may be heated, such as, for example, the thumb bar 28 of the reel casing 26. Further, in some embodiments, a heating element may be disposed within or adjacent to the gear housing 32 of the reel casing 26. It may be desirable to heat the reel casing 26 at a position adjacent to the gear housing 32 because a user may place a hand at this position of the reel casing 26 to grip the reel assembly 24.

In some embodiments, it may be desirable to heat only a portion of the reel assembly 24 rather than the entire reel assembly 24 to save energy, which may consequently prolong the life of the power source 52. In some such embodiments, only components or portions of the reel assembly 24 that come in contact with the hands of the user may be heated. For example, in some embodiments, an outer surface of the side plate 50, the thumb bar 28 and the finger bar 30 of the reel casing 26, and an outer surface of the knob 38 are heated. The heat may be provided by heating elements disposed within each component. It should be understood that embodiments are contemplated which include heating elements disposed in various positions within the reel assembly 24.

In some embodiments, a single heating element in a component of the reel assembly 24 may not be sufficient to heat the entire component. For example, a single heating element may create a temperature gradient within the component, where the temperature is significantly higher at the location of the heating element and significantly lower at another location within the portion. As such, in some embodiments, an array of heating elements may be used to provide evenly distributed heating to the reel assembly 24. For example, in some embodiments, an array of heating elements may be disposed within the thumb bar 28 to heat the thumb bar 28. It should be understood that an array of heating elements may be disposed in any location that a single heating element may be disposed. The array of heating elements may include any number of heating elements. For example, the array of heating elements may comprise 2-10 heating elements though the array of heating elements may comprise more or fewer heating elements.

In some embodiments, a portion of the rod assembly 12 may be heated. For example, the rod 14, reel seat 18, and grip 16 may be heated. In some embodiments, it may be desirable to heat a portion of the rod 14 that comes in contact with the hands of the user during fishing operations, such as casting and retrieving. In some embodiments, the reel seat 18 may be heated by a heating element disposed in the reel assembly 24. Such heating element may be disposed in the reel foot 56 of the reel assembly 24.

In some embodiments, the reel casing 26 may be used to support various other components of the reel assembly 24, such as the spool 42 and the line guide 48. Further, in some embodiments, the reel casing 26 refers to a shell of the reel assembly 24 that encloses internal components of the reel assembly 24. As such, the material for the reel casing 26 may be selected based on structural properties. In typical embodiments, the reel casing 26 may be composed of aluminum, an aluminum alloy, carbon fiber, stainless steel, plastic, or another suitable material.

In some embodiments, it may be additionally desirable to heat the line guide 48 to prevent the line 20 from freezing or accumulating ice. In some such embodiments, a heating element may be disposed adjacent to the line guide 48 to provide heating to the line guide 48. It may also be desirable to control the temperature of the line guide 48 such that the temperature of the line 20 is not heated above a threshold temperature of the line 20. For example, if the line 20 is composed of plastic it may be desirable that the line 20 not be heated above a melting temperature of the plastic. Accordingly, the temperature threshold may be selected at a temperature below the melting temperature of the line 20.

It should be understood that any of the components of the reel assembly 24 may be sized according to a specific application of the invention. For example, the size of the power source 52 may be selected based on the size of the reel, which in turn may vary with the weight of a fishing lure or an intended test weight of the line 20. Accordingly, embodiments of the invention may include a range of sizes for the reel assembly 24, such that the size of the reel assembly 24 is selected based on a weight of a fishing lure.

Figure 2B:
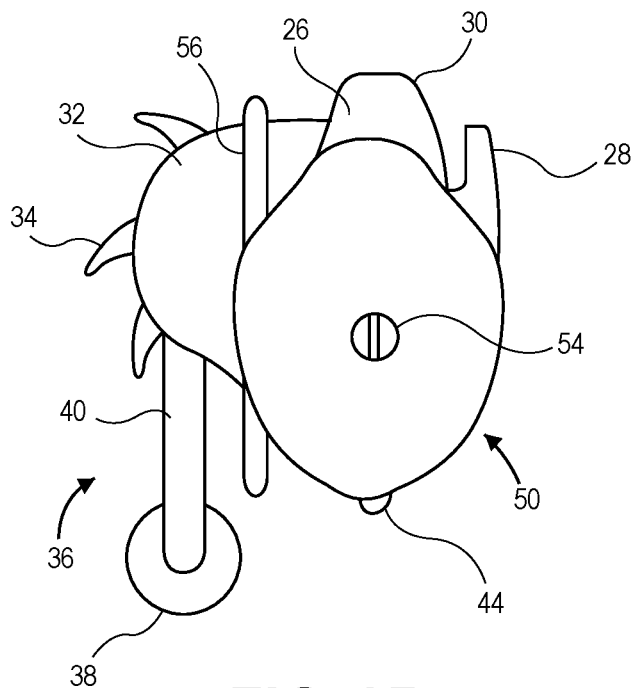
FIG. 2B is a side view of the embodiments of the reel assembly.
Figure 2C:
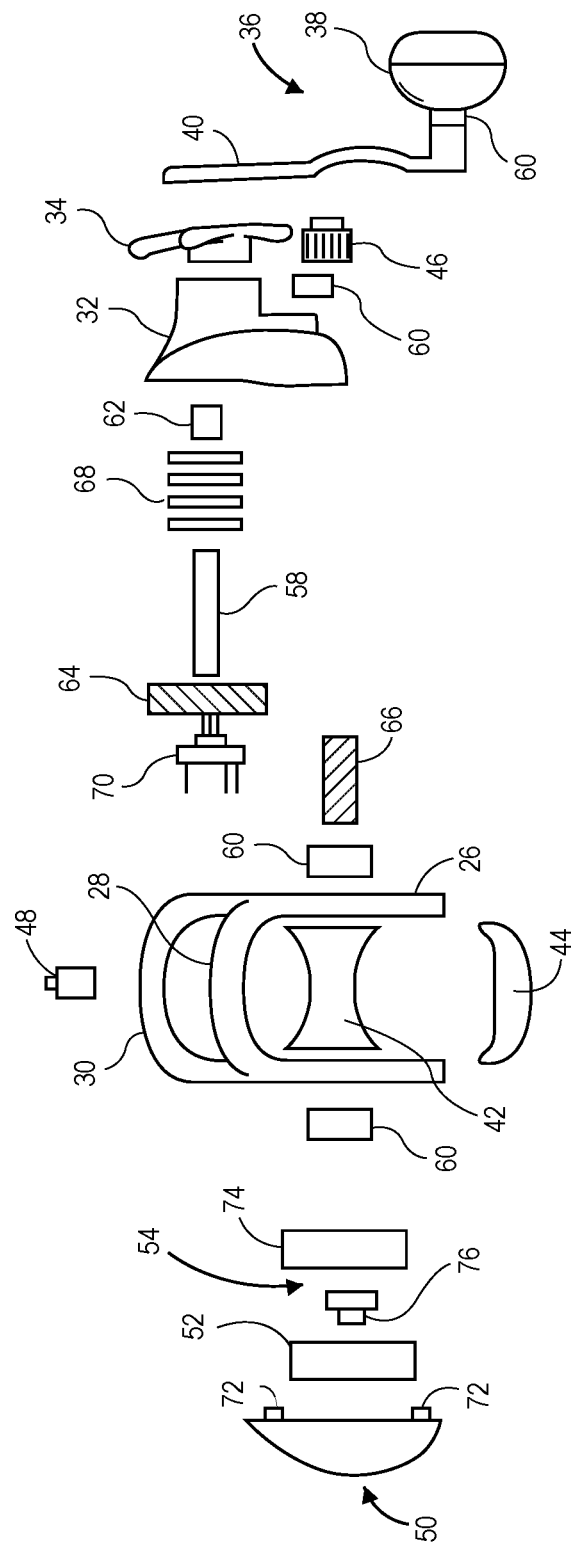
FIG. 2C is an exploded view of the embodiment of the reel assembly.

FIG. 2B shows a side view of the reel assembly 24. As can be seen in FIG. 2B, the reel assembly 24 further comprises a reel foot 56 secured to the reel casing 26 for removably securing the reel assembly 24 to the rod assembly 12 of FIG. 1. When attached to the rod assembly 12, a surface of the reel foot 56 may be mated to a surface of the reel seat 18 of the rod assembly 12. In some embodiments, a locking mechanism of the rod assembly 12 may be used to lock the reel foot 56 in place.

The handle assembly 36 may be attached to the reel casing 26 on a side of the reel casing 26 adjacent to the drag adjustment star 34, as shown in FIG. 2A. The side plate 50 may be removably attached to the reel casing 26. The removable attachment capability of the side plate 50 may be provided by an attachment mechanism (not shown). The attachment mechanism may be any of a clip, a screw, or a lock, though other attachment mechanisms not described herein are contemplated. The attachment mechanism may be disposed on the side plate 50 or on the reel casing 26. In some embodiments, the power source 52 (shown in FIG. 2C) may be mounted within the side plate 50. The power source 52 may be configured to provide power to each of the plurality of heating elements. Power source 52 may be a battery, and the power provided may be electrical power delivered to the heating elements via an electrical circuit within the reel assembly 24. The electrical circuit may be established by electrical wires connecting the power source 52 to the plurality of heating elements. In some embodiments, the heating elements are disposed within the reel casing 26 and attached directly to each other to establish an electrical connection such that electrical wires are not needed to connect the plurality of heating elements.

In some embodiments, the power source 52 may be permanently installed in the reel assembly 24. In such embodiments, the power source 52 may comprise a charging port 130, as will be described below in reference to FIG. 6A. The charging port 130 may be accessible without having to disassemble any portion of the reel assembly 24. In some such embodiments, the charging port 130 may comprise a flap for covering and uncovering the charging port 130, such that the charging port 130 can be covered when not in use. Covering the charging port 130 may be desirable to prevent water from damaging the charging port 130. In some embodiments, the charging port 130 may be a waterproof charging port 130 with a waterproof mechanism, such as, for example, a gasket, an adhesive seal, or any other suitable waterproof mechanism.

In some embodiments, the power source 52, shown in FIG. 2C and mounted in the side plate 50, is a battery. The battery may be selected based on size, lifetime, and temperature capabilities (e.g. power). For example, a battery may be selected based on a small size of the battery so that the battery does not significantly alter the shape and weight of the reel assembly 24. In some embodiments, it is desirable to select a battery with a significant lifetime so that the battery can provide power to the reel assembly 24 for an extended amount of time. It may also be desirable that the battery provide enough power to the heating elements so that a desired temperature of the reel assembly 24 can be reached. Additionally, if a battery is selected as power source 52, the type of battery may be selected to minimize temperature-related drain due to decreased internal resistance at low temperatures. Any type of battery (alkaline, Ni-Cad, Li-Ion, Li-Poly, etc.) now available or later developed is contemplated for use with the invention, with light-weight and compact batteries (as measured for a particular capacity) preferred. A POSITA will be aware of the available types of battery chemistry and be able to select the appropriate type for this application. In some embodiments, the electrical wires may be external to the reel casing 26. In some other embodiments, the electrical wires may be internal to the reel casing 26, which may be a desirable configuration to provide waterproofing and protection to the electrical circuit.

In some embodiments, the reel assembly 24 may include waterproofing means, such as, for example a silicone coating. The silicone coating may be applied onto electrical components of the reel assembly 24, such as electrical wires, and wire leads 102 of FIGS. 4A-C. In some embodiments, waterproofing means may be provided between components of the reel assembly 24, such as, between the reel casing 26 and the side plate 50. Here, the waterproofing means may protect the power source 52 from becoming wet.

In certain embodiments (not pictured), the power source 52 may be disposed in the rod 14 of FIG. 1, such as, for example in the grip 16. In such embodiments, an electrical connection may be established between the reel seat 18 of the rod 14 and the reel foot 56 of the reel assembly 24. The electrical connection transfers power from the power source 52 to the reel assembly 24 to power the heating elements. In some embodiments, the electrical connection may be established using electrical contacts 72, as will be described below in reference to FIG. 2C. It is an advantage of such embodiments that a larger battery may be used without affecting the size of the reel (which must fit within the user's hand). Further, if the rod 14 is configured to house the power source 52, the rod assembly 12 may not be interchangeable with existing rod assemblies that cannot house the power source 52. Thus, in such embodiments, each pole to which the reel is attached must incorporate a power source, limiting the user's choice of pole. As such, in other embodiments, it may be desirable to dispose the power source 52 within the side plate 50, as shown in FIG. 2C, so that the weight of the rod 14 is not affected by the power source 52 and the reel can be interchanged with any pole the user prefers to use. In still other embodiments, a first battery (for example, a smaller, lower-capacity battery) is incorporated into the reel and a second battery (for example, a larger, high-capacity battery) is incorporated into at least one pole compatible with the reel. In this way, the additional battery capacity can be used when the heated reel is used with a compatible pole, but the heated reel remains useable even when used with a third-party, non-compatible pole.

In some embodiments, the power source 52 may not be disposed in either of the reel assembly 24 or the rod assembly 12. In such embodiments, the power source 52 may be external to the reel and rod assembly 10. Accordingly, the power source 52 may be held by the user. For example, the power source 52 may be placed within a pocket of the user. The power source 52 may be configured to transfer power through a cable to the reel assembly 24. As such, the reel assembly 24 may comprise a power port configured to receive electrical power from said cable. It may be desirable for power source 52 to be external to the reel and rod assembly 10 so that the weight and shape of the reel and rod assembly 10 are not significantly altered. Such embodiments may be undesirable where, for example, the cable interferes with operation of the reel and rod assembly 10. For this reason, in some embodiments, the cable may be removably attached to the power port via a magnetic connection.

FIG. 2C shows an exploded view of the reel assembly 24. The reel assembly 24 may further comprise internal components, such as a drive shaft 58, bearings 60, a one-way clutch 62, a drive gear 64, a pinion gear 66, and drag washers 68. In some embodiments, the reel assembly 24 further comprises at least one slip ring 70. In some embodiments, the side plate 50 may comprise electrical contacts 72, as shown, to complete the electrical circuit when the side plate 50 is attached to the reel casing 26. In some embodiments, the electrical contacts 72 may be exposed metal ends that maintain physical contact with a metal end of the reel casing 26 while the side plate 50, comprising the power source 52, is attached to the reel casing 26. In some embodiments, the brake 54 of the side plate 50 may comprise a magnetic brake 74 and a brake adjustment knob 76, as shown. In some embodiments, it may be desirable to position the brake 54 in an alternate position of the reel assembly 24 to provide more room for the power source 52, such as, for example, adjacent the spool tension knob 46. Similarly, in some embodiments, the brake 54 may be absent from the reel assembly 24.

In some embodiments, the slip ring 70 may be disposed adjacent to the drive gear 64 to transfer electrical power from the reel casing 26 through the drive gear 64, such that the drive gear 64 is enabled to rotate freely. Alternatively, the slip ring 70 may be disposed adjacent to one of the bearings 60 or the one-way clutch 62. The slip ring 70 is a rotary electrical interface that allows electricity to be passed through rotating mechanical components such as bearings 60, and drive shaft 58. In some embodiments, the slip ring 70 is disposed in the reel casing 26 to transfer electrical power from wires in the reel casing 26 through the drive shaft 58 into the handle assembly 36.

In some embodiments, an electrical current may be passed directly through at least one of the bearings 60, the one way clutch 62, and the drive shaft 58, such that electrical power may be passed from the power source 52 to the handle assembly 36 to power at least one handle heating element of the handle assembly 36. In embodiments where electrical current is passed through the drive shaft 58, the drive shaft 58 may behave similarly to the slip ring 70 as described herein.

Figure 3A:
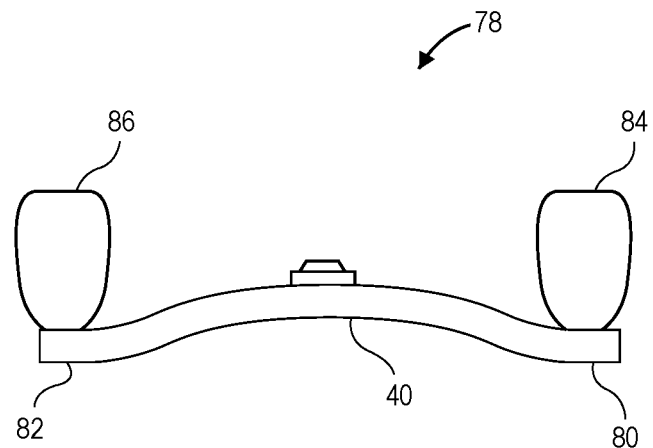
FIG. 3A is an embodiment of a double handle assembly.
Figure 3B:
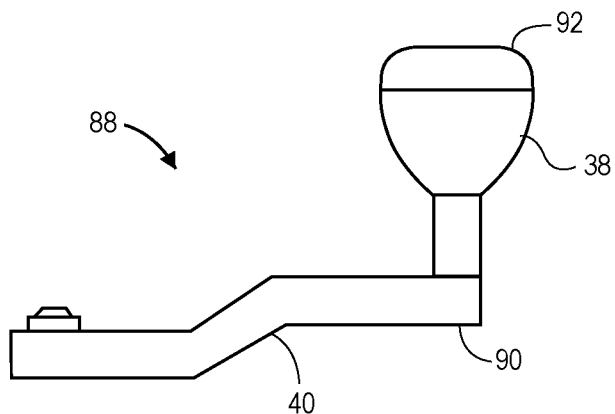
FIG. 3B is an embodiment of a single handle assembly.

FIG. 3A depicts a double handle assembly 78 used with some embodiments of the invention. In some embodiments, the handle assembly 36 of FIGS. 2A-C may be the double handle assembly 78. The double handle assembly 78 comprises a rocker arm 40 including a first distal end 80 and a second distal end 82, a first knob 84 rotatably attached at the first distal end 80 of the rocker arm 40 and a second knob 86 rotatably attached at the second distal end 82 of the rocker arm 40. The rocker arm 40 is configured to be attached to the drive shaft 58 to drive rotation of the drive shaft 58. In some embodiments, the double handle assembly 78 may comprise at least one handle heating element. The handle heating element may be placed in each of the first knob 84 and the second knob 86. In some embodiments, both the first knob 84 and the second knob 86 have a handle heating element embedded into the surface of the respective handle. In some embodiments, the handle heating elements may receive power from the power source 52 or from a separate handle power source 92, as shown in FIG. 3B. It should be understood that the heating elements are not limited to any one of these powering methods, and that in some embodiments, the handle heating elements may receive power from any suitable source. Broadly speaking, handle power source 92 is similar to power source 52, and all of the discussions and alternate embodiments discussed herein for power source 52 also apply to power source 92. In some embodiments, both the first knob 84 and the second knob 86 each include a handle power source such as power source 92. Further, in some embodiments, an additional handle heating element may be disposed within the rocker arm 40 for heating the rocker arm 40.

In embodiments where the handle heating elements receive power from the power source 52 mounted in the side plate 50, electrical power may be passed through the slip ring 70. In some embodiments, additional slip rings 70 may be included. A second slip ring may be disposed at the connection of the first knob 84 to the first distal end 80 of the rocker arm 40 and a third slip ring may be disposed at the connection of the second knob 86 to the second distal end 82 of the rocker arm 40. The second slip ring and third slip ring allow electrical power to be transferred into the rotating first knob 84 and the rotating second knob 86 from the rocker arm 40. It should be understood that the slip rings 70 allow electricity to be passed from a first part to a second part that rotates independently from said first part, thus the slip rings 70 may be used at various other locations in the reel assembly 24. In some embodiments, varying numbers of slip rings 70 may be included, such as, for example, 1, 2, and 5. Further, in some embodiments, no slip rings 70 are included. In such embodiments, electrical power may be transferred through rotating parts by another means, or the power source 52 and heating elements may be positioned such that no slip rings 70 are needed.

FIG. 3B shows a single handle assembly 88. In some embodiments, the handle assembly 36 may be the single handle assembly 88. The single handle assembly 88 comprises rocker arm 40 including a single distal end 90 and knob 38 mounted at the single distal end 90 of the rocker arm 40. The knob 38 may be larger than the first knob 84 and second knob 86 of the double handle assembly 78 in FIG. 3A. In some embodiments, the handle power source 92 may be mounted in the knob 38, as shown. The larger knob 38 may be desirable as the larger surface area of said knob 38 allows for a higher heat transfer rate to the hands of the user. The knob 38, in some embodiments, comprises at least one handle heating element, embedded in the outer surface of the knob 38. Said handle heating element may receive power from the handle power source 92, if included, or from the power source 52. When receiving power from the power source 52, electrical power may be transferred through at least one slip ring, similarly to the system described in reference to FIG. 3A. The handle heating element may alternatively be secured to the outer surface of the knob 38 or disposed within the knob 38. In some embodiments, the knob 38 may be hollow for housing at least one of the handle power source 92 and the handle heating element.

In some embodiments, the handle power source 92 may be permanently mounted in the knob 38. Here, the knob 38 or handle power source 92 comprises a power port or charging port for powering and charging the handle power source 92 respectively. Further, in some embodiments, the knob 38 is removably attached to the rocker arm 40, such that the knob 38 can be removed for charging the handle power source 92.

It should be understood that the handle assembly 36 may be heated independently from the rest of the reel assembly 24. As such, in some embodiments, the invention includes only the handle assembly 36 distinct from the reel assembly 24. In such embodiments, the handle assembly 36 is configured to be attached to the drive shaft 58 of the reel assembly 24. The handle assembly 36 may be interchangeable with handle assemblies on existing reel assemblies, such that the existing reel assemblies can be retrofit with the handle assembly 36. In such embodiments, only the handle assembly 36 may be heated. Alternatively, the handle assembly 36 may be heated along with other components of the reel assembly 24.

Figure 3C:
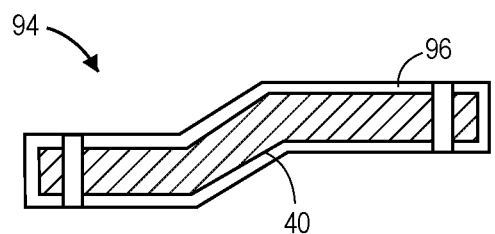
FIG. 3C is a cross-sectional view of a heat conducting rocker arm of an embodiment of the invention.

FIG. 3C is a cross-sectional view of a heat-conducting rocker arm assembly 94 of an embodiment of the invention. In such embodiments, various components of the handle assembly 36 may be heat-conducting or heat-insulating. The thermal conductivity of the components may be determined by the material selected for the components. For example, the rocker arm 40 may be composed of copper (or include copper heat pipes) to conduct heat. As such, the rocker arm 40, in some embodiments, is the heating element. In some embodiments, at least one heating element may be disposed on the rocker arm 40. It should be understood that various other materials may be selected based on the thermal conductivity of each respective material. Exemplary materials with high thermal conductivity are copper, silver, and aluminum, though other materials may be suitable. In some such embodiments, the rocker arm 40 may include an insulated cover 96 such that heat loss from the rocker arm 40 is mitigated. The insulated cover 96 may be composed of a material with a relatively low thermal conductivity. Exemplary materials with low thermal conductivity include wood, ceramic, and foam, though other materials may be suitable. Accordingly, the rocker arm 40 may transfer heat from a heating element to the knob 38. The insulated cover 96 prevents heat loss from the rocker arm 40 so the heat supplied from the heating element is directed to the knob 38.

Figure 4A:
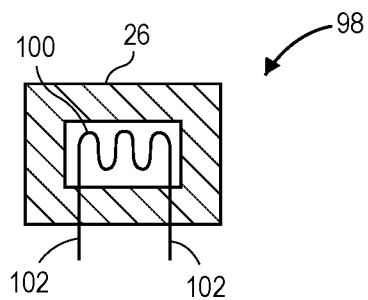
FIG. 4A depicts an electrically resistive heating element for some embodiments of the invention.

FIG. 4A is an electrically resistive heating element 98 used as the heating element for some embodiments of the invention. The electrically resistive heating element 98 comprises a filament 100, and wire leads 102. In some embodiments, the electrically resistive heating element 98 may be embedded into a component of the reel assembly 24, as shown. The resistive heating element may be embedded into any component of the reel assembly 24, such as, for example, the reel casing 26, the side plate 50, and the knob 38 of the handle assembly 36. The wire leads 102 are used to transfer electrical power to the resistive heating element. In some embodiments, a plurality of resistive heating elements may be used.

Figure 4B:
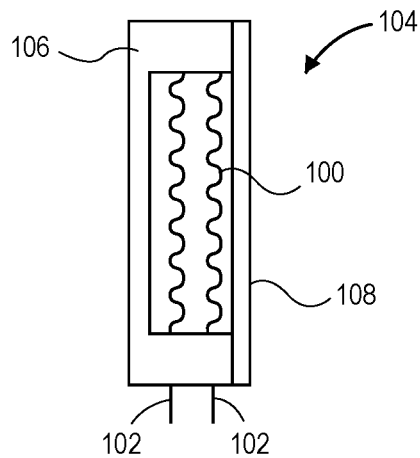
FIG. 4B depicts a radiative heating element for some embodiments of the invention.

FIG. 4B is a radiative heating element 104 used as the heating element for some embodiments of the invention. The radiative heating element 104 comprises a filament 100, a housing 106, a cover 108, and wire leads 102. In some embodiments, the radiative heating element 104 is attached to an outer surface of a component of the reel assembly 24, such as, for example, on an outer surface of the gear housing 32 facing the handle assembly 36. In such example, the radiative heating element 104 is an infrared heating element that emits infrared radiation towards the rocker arm 40 of the handle assembly 36 to heat the handle assembly 36. It should be understood that the radiative heating element 104 of some embodiments may be an infrared heating element and may be disposed in various locations of the reel assembly 24.

Figure 4C:
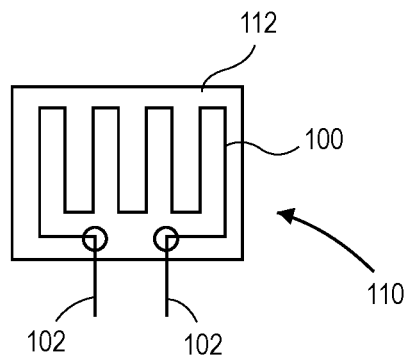
FIG. 4C depicts a film heating element for some embodiments of the invention.

FIG. 4C is a film heating element 110 used as the heating element for some embodiments of the invention. The film heating element 110 comprises a filament 100, a film 112, and wire leads 102. The film heating element 110 may have a significantly thin thickness compared to other types of heating elements. In some embodiments, it may be desirable to include the film heating element 110 because of significantly thin thickness. Accordingly, the film heating element 110 may be attached to the outer surface of any component of the reel assembly 24 without significantly affecting the shape of the reel assembly 24. In one embodiment, a plurality of film heating elements 110 may be disposed across the outer surface of the reel casing 26 and the side plate 50.

In some embodiments, a plurality of heating elements may be included. The plurality of heating elements may consist of any combination of the heating element types described herein or other types of suitable heating elements. For example, the reel assembly 24 may comprise a plurality of electrically resistive heating elements 98, a radiative heating element 104, and a plurality of film heating elements 110. Alternatively, a plurality of heating elements of a single type may be included. For example, a plurality of resistive heating elements may be used. The plurality of heating elements may be disposed at various locations of the reel assembly 24 to heat various components. It should be understood that embodiments may include at least one heating element in any component that is described as being heated herein.

It should be understood that any of the heating element types described herein may be employed as the handle heating element described in reference to FIGS. 3A and 3B. For example, the handle heating element may be one of the electrically resistive heating element 98, the radiative heating element 104, and the film heating element 110. Further, any component of the reel assembly 24 may comprise material such that the component itself is a heating element.

In addition to the heating elements described above, alternative heating means may be used to heat the reel assembly 24. The alternative heating means may not be electrically powered but any other heating method, such as, for example, a chemical heat source. In some embodiments, the chemical heat source may be disposed in the reel assembly 24 to provide heat to the reel assembly 24. In such embodiments, the power source 52 may not be included, rather the reel assembly 24 may comprise a fuel for the chemical heat source. The chemical heat source may be configured to experience an exothermic chemical reaction to release heat to the reel assembly 24. An exemplary chemical heat source may comprise iron powder that undergoes an exothermic reaction with oxygen in the surrounding environment. In some embodiments, the chemical heat source may be disposable and replaceable, such that the user can remove the chemical heat source and replace the chemical heat source with a new chemical heat source. In some embodiments, the power source 52 may initiate the chemical reaction that releases the heat.

Further, in some embodiments, a fluid heating cycle may be used. The fluid heating cycle may comprise a fluid that is circulated through the reel assembly 24. The fluid may be any suitable fluid such as for example, water, oil, and grease, etc. In such embodiments, the fluid carries heat from a heat source through fluid channels to various components of the reel assembly 24. The fluid may be actively pumped through the fluid channels or passively circulated through the fluid channels. In some embodiments, the fluid may be grease that is circulated through the gear housing 32 to grease the bearings 60. The heat source may be any suitable means of heating, such as, for example, the electrically resistive heating element 98, radiative heating element 104, the film heating element 110, and the chemical heat source. The fluid channels may be channels within the reel casing 26 that allow the fluid to be circulated through the reel assembly 24.

Figure 5:
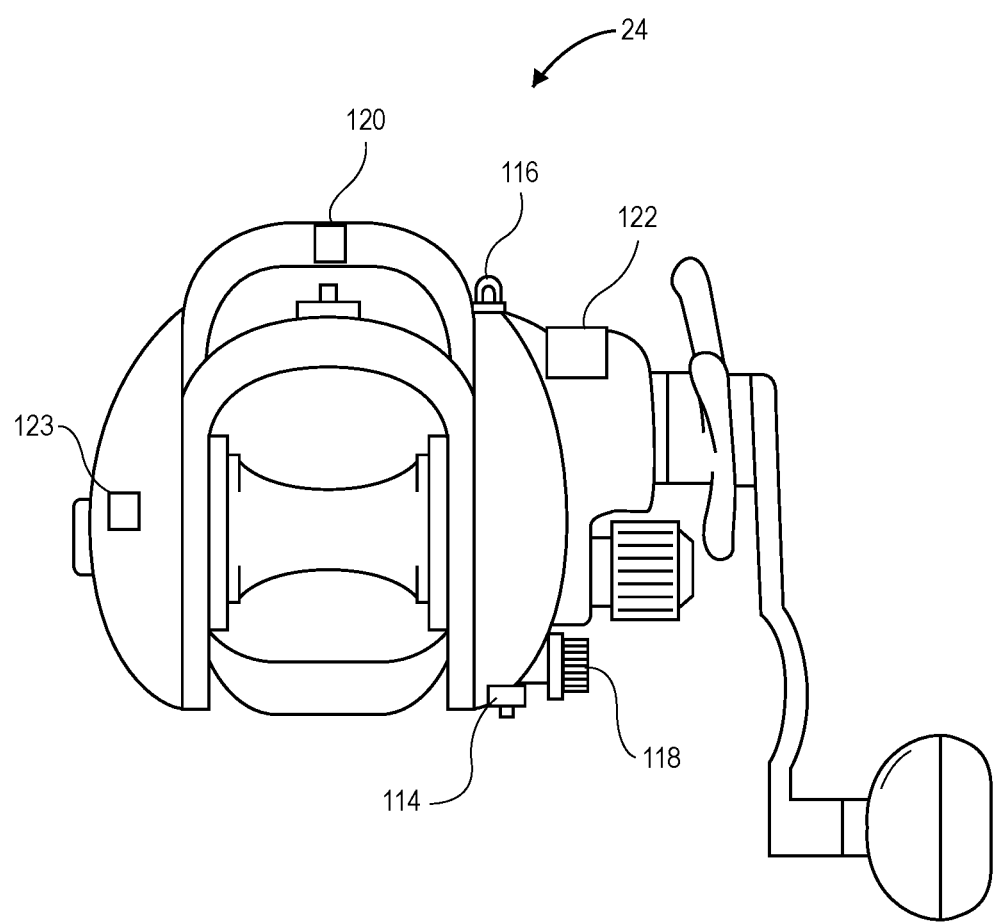
FIG. 5 depicts an embodiment of a reel assembly with accessories.

FIG. 5 depicts the reel assembly 24 with various accessories. In some embodiments, the reel assembly 24 may further comprise at least one accessory component, such as a power switch 114, an indicator light 116, a heat adjustment component 118, a temperature sensor 120, and a controller 122. It should be understood that in some embodiments, some of the accessory components mentioned may be absent with various combinations of the accessory components described herein being included. For example, embodiments may include the power switch 114 and indicator light 116 but not include the temperature sensor 120 and controller 122. The accessory components may be arranged similarly to the arrangement shown in FIG. 5, though various other arrangements are contemplated. For example, it may be desirable to place the power switch 114 and heat adjustment component 118 on the side of the reel casing 26 facing the handle assembly 36 so that the accessory components do not interfere with hand placement of the user during operation of the reel assembly 24. Alternatively, in some embodiments, a portion of the accessory components may be disposed within the side plate 50. In such embodiments, the accessory components may be disposed in recessed slots so that the accessory components are flush with the outer surface of the side plate 50. Thus, the accessory components will not interfere with winding or casting operations of the reel assembly 24.

In some embodiments, the power switch 114 is operable to control the electronic circuit. Accordingly, the power switch 114 can be set to an "on" state or an "off" state based on an operator input. In embodiments that include the controller 122, the state of the power switch 114 may alternatively or additionally be set by the controller 122. When positioned in the "on" position, the power switch 114 completes the electrical circuit to thereby provide power from the power source 52 to the heating elements. During the off state, the power switch 114 opens the electrical circuit to disable the electrical circuit. Accordingly, when the power switch 114 is set to the off state, the heating elements will not be energized. The power switch 114 may be a toggle switch, a push button switch, a limit switch, or the like. Alternatively, in some embodiments, especially where the power switch 114 is set by the controller 122, the power switch 114 may be a semiconductor switch that is operated based on a signal received from the controller 122 based on user input.

In some embodiments, the indicator light 116 may be included with the reel assembly 24. The indicator light 116 may be positioned on any part of the reel assembly 24, such as on the reel casing 26, as shown. In some embodiments, the indicator light 116 may be a light emitting diode (LED); however, embodiments are not limited to LEDs. Any suitable light may be used as the indicator light 116. The indicator light 116 may be used to indicate a received electrical signal. For example, the indicator light 116 may be part of the electrical circuit and emit light when the circuit is powered on. Additionally, the indicator light 116 may emit different colors based on a received electrical signal. Alternatively, a plurality of indicator lights 116 may be used. Here, each of the plurality of indicator lights 116 may be operated independently. The indicator light 116 may also be used to display the battery life, with a color or brightness corresponding to a value of the battery life of the power source 52. For example, a high battery life may be indicated by a green indicator light 116, while a low battery life may be indicated by a red indicator light 116. In some embodiments, the indicator light 116 may receive an electrical signal from the controller 122.

The heat adjustment component 118 may be used to adjust the heating of the heating elements. In some embodiments, the heat adjustment component 118 may be used with or in place of the power switch 114. For example, some embodiments may use the heat adjustment component 118 to intermittently open the electrical circuit to thereby disable the flow of power from the power source 52 to the heating elements, thereby controlling the temperature with a user-specified range. In some embodiments, the heat adjustment component 118 may be a rotatable dial, as shown. The heat adjustment component 118 may be rotated in one direction to increase the heat produced by the heating elements and be rotated in a second direction opposite the first direction, to decrease the heat produced by the heating elements. In such embodiments, the heat adjustment component 118, may be a rotary potentiometer that adjusts the voltage and current supplied to the heating elements based on a physical position of the rotatable dial. In some embodiments, an electrical resistance may be adjusted. In some other embodiments, the heat adjustment component 118 may produce a signal that is used as an input to the controller 122. The heat adjustment component 118 may adjust the temperature of the heating elements within a temperature range. The temperature range may be selected based on a maximum safe operating temperature. Said maximum safe operating temperature may be a maximum of the temperature range and in some embodiments, may be a temperature threshold. Such embodiments may restrict power to the heating elements when the temperature threshold is exceeded.

In further embodiments, the heat adjustment component 118 may be a button (not shown) that, when held down, activates the heating elements or disables the heating elements. In such embodiments, the heat adjustment component 118 may be pressed to toggle between low, medium, and high heating temperatures of the heating elements. It should be understood that the heat adjustment component 118 may be any suitable input device to adjust the temperature of the heating elements, such as, for example, a dial, a button, a switch, and a lever.

In some embodiments, the temperature sensor 120 may be used to detect a temperature of the reel assembly 24. The temperature sensor 120 may be disposed at various locations internal or external to the reel assembly 24, such as, on or within the reel casing 26. The temperature sensors 120 detect the temperature at the respective location. The detected temperature may be represented by an electrical signal emitted from the temperature sensor 120. Said electrical signal may be received as an input to the controller 122 or to the power switch 114. In some embodiments, a signal indicative of a detected temperature above the threshold temperature from the temperature signal will trigger the power switch 114 to turn to the off state. In such embodiments, the power switch 114 is an automatic safety switch that prevents heating above the threshold temperature.

In some embodiments, the controller 122 may be used. The controller 122 may receive various input signals, such as the previously described input signals. The controller 122 may additionally produce output signals. The output signals may be used to control device functions such as, changing the state of the power switch 114, adjusting the heat adjustment component 118, and operating the indicator light 116. In particular, where the controller adjusts power (or current) in a high-power (or high-current) circuit, one or more MOSFETs (metal-oxide semiconductor field-effect transistors) may be used to switch the power such that the controller need not conduct high currents. The controller 122 may receive electrical power from the power source 52. In some embodiments, the controller 122 is housed in the side plate 50 (left or right) and the reel casing 26. It may be desirable to place the controller 122 within the reel casing 26 in embodiments, where the power source 52 is an interchangeable and rechargeable battery, to simplify the components of the battery and reduce cost.

In some embodiments, the controller 122 may comprise a display. The display may be used to give feedback to the operator associated with operation of the reel assembly 24. The display may be used similarly to the indicator light 116 as described herein. In some embodiments, the display may be a touch screen that is operable to receive operator input. Here, the operator may use the touch screen to activate/disable the heating elements or adjust the power supplied to the heating elements. It should be understood that the touch screen may perform similar operations as the power switch 114 and heat adjustment component 118 as described herein.

In some embodiments, the reel assembly 24 may further comprise at least one touch sensor 123. The touch sensor 123 may be any of a pressure sensor, a resistance sensor, a capacitive sensor, and any other sensor suitable to detect the hands of the operator. In such embodiments, the touch sensor 123 may be used to detect when the user's hands are placed on or adjacent to the touch sensor 123. The touch sensor 123 may be placed on the side plate 50, as shown, or at various other positions of the reel assembly 24. The touch sensor 123 may be operable to activate the heating elements when the user's hands are detected. For example, the touch sensor 123 may be placed in each of the first knob 84 and second knob 86 of the double handle assembly 78 to detect which of the knobs, if any, that the user's hand is placed on. A respective heating element within whichever knob that the user is holding may then be activated.

In some embodiments, the touch sensor 123 may provide energy savings for the power source 52 by reducing power consumption when the user is not holding the reel assembly 24 or not touching a specific component of the reel assembly 24. Embodiments are contemplated in which heating elements are only activated when it is detected that the user's hands are adjacent to each respective heating element. For example, when one of the user's hands touches a portion of the reel casing 26, the touch sensor 123 detects the user's hand and activates a heating element disposed in said portion of the reel casing 26. In some embodiments, the touch sensor 123 may send a signal to the controller 122 indicative of whether the user's hands are contacting a component or a portion of a component of the reel assembly 24. The controller 122 may then activate the heating elements based at least in part on the signal from the touch sensor 123.

Figure 6B:
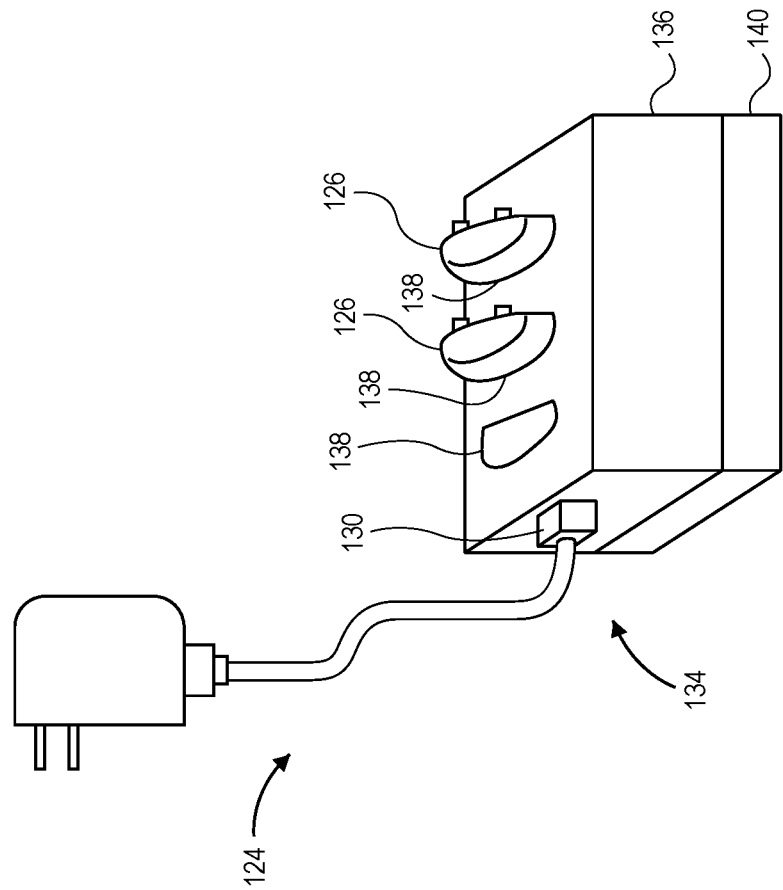
FIG. 6B is a charging tray for some embodiments of the invention.
Figure 6A:
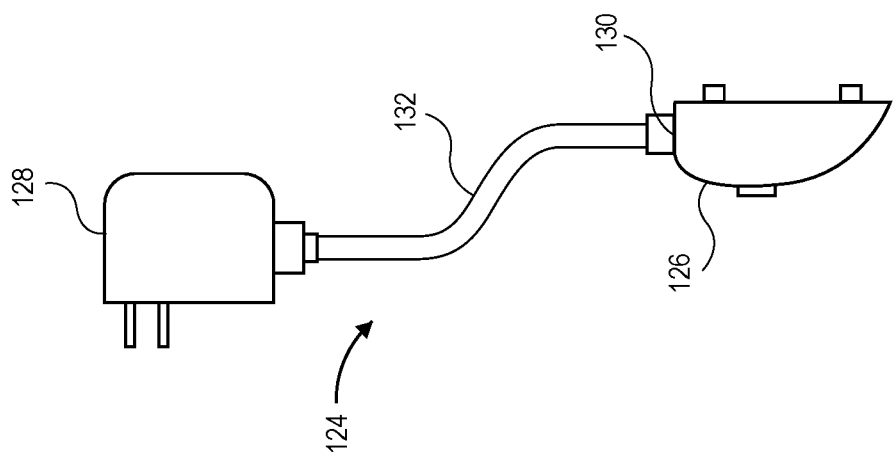
FIG. 6A is a charger for some embodiments of the invention.

FIG. 6A shows a charger 124 of an embodiment of the invention. The charger 124 may be used to charge a battery 126, which may be the power source 52 of FIGS. 2A-C. In some embodiments (not shown), the battery 126 may be permanently mounted in the side plate 50, and used in turn to charge one or more batteries (such as power source 52) disposed in a respective one or more side plates (such as side plate 50). Further, in some embodiments the battery 126 shown may be the side plate 50 comprising the power source 52 and removeable from charger 124, such that the battery 126 may be selectively attached to the reel casing 26. In some such embodiments, the charger 124 may also be used to charge a plurality of batteries, such that each battery can be attached to the reel and/or handle as needed. In this way, heating of the reel and/or handle can be maintained for an extended fishing session without needing to attach a single, bulky, high-capacity battery to the reel. In some embodiments, the charger 124 may be adapted to draw power from a wall socket, such as a standard 120 volt 60 Hz socket. The charger 124 may also comprise a power adapter 128, as shown. The power adapter 128 converts electrical power to a desired form. For example, the power adapter 128 may convert 120 volt alternating current to 5 volt direct current to power the battery. It should be understood that various alternative voltages and currents may be used by the charger 124.

In some embodiments, the charger 124 may directly charge the battery via a charging port 130 disposed on the battery, as shown. The charger 124 further comprises a cable 132, which is configured to carry electrical current to the battery. In some embodiments, the power source 52 may be charged using the electrical contacts 72 rather than charging port 130. In such embodiments, charging port 130 may not be included. Further, in some embodiments, the charger 124 comprises a USB connection for establishing an electrical connection through a USB port. A USB connection of the charger 124 is desirable for charging the battery in a car or boat having a USB port. It should be understood that embodiments of the invention are not limited to the charging methods described herein. In some embodiments, any suitable method of charging may be used.

FIG. 6B is a charging tray 134 for an embodiment of the invention. In some embodiments, the charging tray 134 may be a mobile charging station for charging at least one battery 126. The charging tray 134 comprises a main housing 136, a plurality of slots 138, a charging port 130, and a high-capacity battery 140. In some embodiments, the charging tray 134 is used to charge at least one battery. Embodiments are contemplated with any number of slots 138 though the embodiment shown provides three slots 138. Each of the slots 138 is configured to receive a battery and provide an electrical connection to said battery. The electrical connection provides electrical power from the high-capacity battery 140, which may be mounted on the bottom of the main housing 136, as shown. It should be understood that various other mounting positions of the high-capacity battery 140 are possible and within the scope of the invention. Further, in some embodiments, the high-capacity battery 140 is not necessarily included. In such embodiments, the charging tray 134 does not store power and is used to transfer electrical power directly from the charging port 130 to at least one battery.

In some embodiments, the high-capacity battery 140 is removably attached to the main housing 136, while other embodiments may include a permanently attached high-capacity battery 140. The high-capacity battery 140 may be charged using the charger 124, as described in reference to FIG. 6A. In some embodiments, the high-capacity battery 140 stores an electrical charge capable of fully charging a plurality of batteries. Each of said plurality of batteries may be interchangeable and used as the power source 52 of FIGS. 2A-2C. Accordingly, the plurality of batteries can be rotated from the charging tray 134 for charging and to the reel assembly 24 for powering the at least one heating element.

In some embodiments, the battery 126 is disposed in the side plate 50. The side plate 50 may be removed from the reel assembly 24 and connected directly to the charging tray 134 at the slot 138 to charge the battery 126.

Figure 6C:
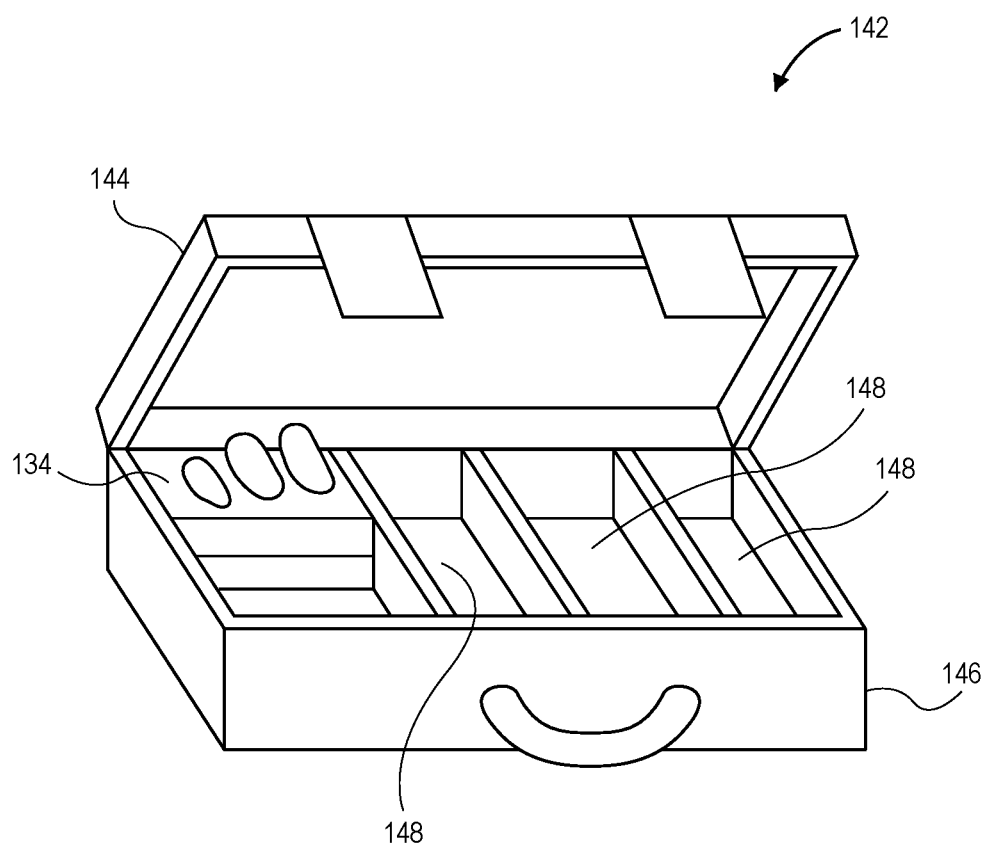
FIG. 6C is a depiction of the charging tray integrated into a tacklebox for some embodiments of the invention.

FIG. 6C is a depiction of the charging tray 134 integrated into a tacklebox 142 for an embodiment of the invention. The tacklebox 142 may be a container for storing fishing gear, such as, for example, a set of pliers, fishing lures, line weights, a tape measure, replacement fishing line, etc. The tacklebox 142 comprises a lid 144, a bottom section 146, and a plurality of compartments 148 for storing said fishing gear. In such an embodiment, the tacklebox 142 may be configured to house the charging tray 134. The charging tray 134 may be removably attached to the tacklebox 142 or permanently attached to the tacklebox 142. It may be desirable to integrate the charging tray 134 into the tacklebox 142 so that the charging tray 134 is portable and may be carried along with the fishing gear. It should be understood that the charging tray 134 may alternatively be integrated into various other types of portable containers, such as, for example, a backpack.

An exemplary situation employing an exemplary embodiment of the invention will now be described. A user, which in this example is a fisherman, is on a winter fishing trip in a cold climate. Before the fishing trip the user charges the high-capacity battery 140 of the charging tray 134 which is installed in the tacklebox 142. At the destination of the fishing trip the user traverses a bank adjacent to a pond while carrying the tacklebox 142 and the reel and rod assembly 10 with them. For the sake of this example, the surrounding outdoor temperature of the destination is slightly above freezing, though embodiments of the invention may be employed at any temperature. The user casts a lure into the pond using the rod and reel assembly 10. After casting, the user begins winding the reel assembly 24 while resting one hand on the reel casing 26 and side plate 50 and gripping the knob 38 of the handle assembly 36 with the other hand. The user's hands become cold from gripping the reel assembly 24 so the user presses the power switch 114 to turn on the heating elements within the reel assembly 24. Consequently, the reel assembly 24 is heated and the user's hands are warmed. As a result, the user is enabled to comfortably continue fishing.

Eventually the heat of the reel assembly 24 exceeds a comfortable temperature limit according to the user. The user then adjusts the heat adjustment component 118 to decrease the temperature of the heating elements. Thus, the reel assembly 24 is held at a comfortable temperature according to a preference of the user.

Continuing the example above, after an hour the indicator light 116 begins to flash red. The flashing red indicator light 116 signals to the user that the power source 52, which in this example is a first battery, is running low. The user then removes the side plate 50 housing the power source 52. Next the user opens the tacklebox 142 to reveal the charging tray 134 which holds a second battery and a third battery. The user then places the first battery into an open slot 138 of the charging tray 134 so that the high-capacity battery 140 can charge the first battery. While the first battery is charging the user places the second battery into the reel assembly 24 and turns on the power switch 114. Thus, the user is again enabled to continue fishing in the cold temperature while the reel assembly 24 warms the user's hands.

It should be understood that the exemplary situation described above is aimed at illustrating potential features of the invention. The invention is not limited to said features and embodiments are contemplated in which some features are not included and additional features are added. For example, in an embodiment, the tacklebox 142 may not be included. Here, the user may charge the first battery, second battery, and third battery before the fishing trip. The user may then carry each of the batteries and replace the battery in use to extend the lifetime of the heated fishing reel to thereby extend the fishing time. In some embodiments, it may be desirable not to include the tacklebox 142 and charging tray 134, such that the user does not have to purchase and carry additional equipment while fishing.

Figure 7:
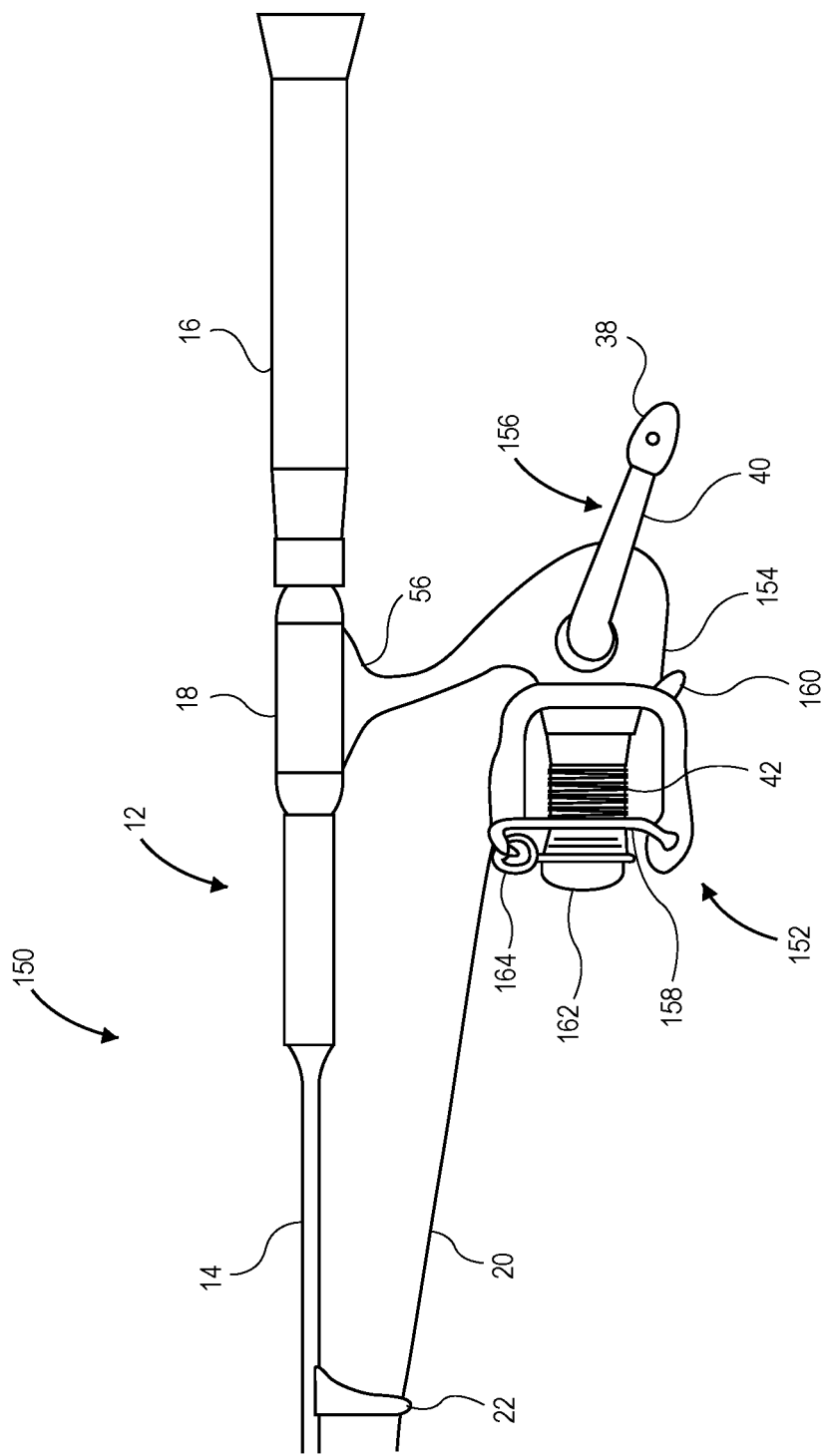
FIG. 7 shows a side view of a spinning-style reel and rod for some embodiments of the invention.

FIG. 7 shows a side view of a spinning-style reel and rod assembly 150 for an embodiment of the invention. It should be understood that aspects of the invention may be employed into spinning-style reels and are not limited to the preferred baitcasting-style reel embodiments. The spinning-style reel and rod assembly 150 comprises a rod assembly 12 and a spinning-style reel assembly 152. The rod assembly 12, similarly, to the rod assembly 12 of FIG. 1, comprises a rod 14, a grip 16, a reel seat 18, a line 20, and at least one eye 22 attached to the rod 14. The reel seat 18 may be configured to receive a reel foot 56 of the spinning-style reel assembly 152, such that the spinning-style reel assembly 152 may be removably attached to the rod assembly 12.

The spinning-style reel assembly 152 comprises a reel body 154, a handle assembly 156 having a rocker arm 40 and at least one knob 38, the reel foot 56, a bail 158, an anti-reverse switch 160, a spool 42, a drag adjustment 162, and a line roller 164. Any of the components of the spinning-style reel assembly described herein may be heated, such as, for example, the knob and the reel foot 56.

In some embodiments, a portion of the rod assembly 12 may be heated. For example, the reel seat 18 where the reel foot 56 of the spinning-style reel is attached and may be heated. The heating of the reel and the rod may be carried out using any of the heating methods described herein or any other suitable heating method. For example, the spinning-style reel assembly and the rod assembly 12 may be heated by heating elements disposed within at least one of the reel body, the knob, the reel foot 56, and the reel seat 18. Aspects of the invention may also be employed to fly fishing reels, as will be described below.

Figure 8:
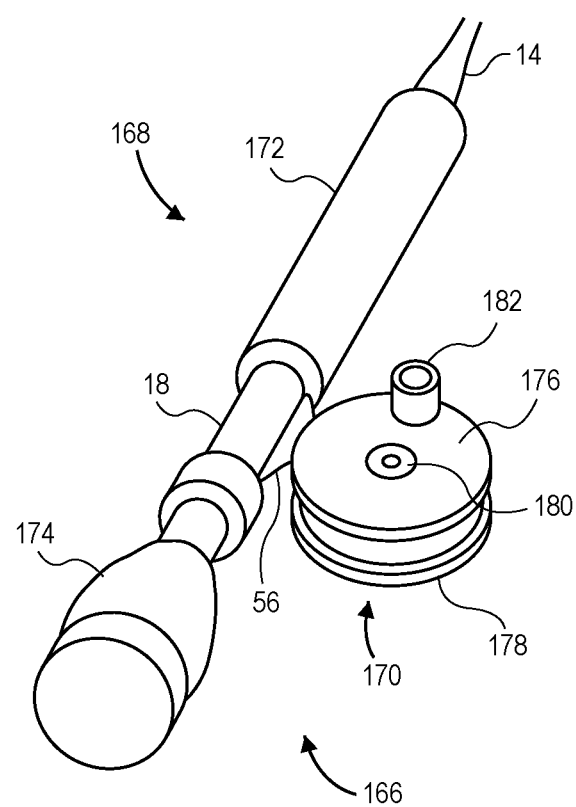
FIG. 8 shows a fly fishing reel and rod for some embodiments of the invention.

FIG. 8 shows a fly reel and rod assembly 166 for an embodiment of the invention. The fly fishing style reel and rod assembly 166 is a fly fishing style reel and rod comprising a fly rod assembly 168 and a fly reel assembly 170 removably attached to the fly rod assembly 168. In some embodiments, the fly rod assembly 168 comprises a rod 14, an upper rod grip 172, a lower rod grip 174, and a reel seat 18 for receiving a reel foot 56 of the fly reel assembly 170. In some embodiments, the fly reel assembly 170 comprises reel foot 56, a first side plate 176, a second side plate 178, a spool cylinder 180 disposed between the first side plate 176 and the second side plate 178, and a winding knob 182 attached to the first side plate 176 for winding line 20 around the spool cylinder 180.

In some embodiments, at least one heating element may be included in the fly reel assembly 170. The heating element may be disposed in any of a variety of locations within the fly reel assembly 170, such as, for example, in the first side plate 176, in the second side plate 178, in the spool cylinder 180, and in the winding knob 182. In some embodiments, a heating element may be disposed on an outer plate of the spool cylinder 180. In some embodiments, the fly reel assembly 170 further comprises a battery which may be power source 52. The battery may be disposed within the spool cylinder 180 or within the winding knob 182 for powering the at least one heating element. In some embodiments, a plurality of heating elements may be used disposed in any combination of the locations described herein. In some embodiments, the fly reel assembly 170 further comprises internal conductive components to establish an electrical connection between the battery and the plurality of heating elements.

In some embodiments, the fly rod assembly 168 further comprises at least one heating element. Heating elements may be disposed in the fly rod assembly 168 in any of the upper grip 172, the lower grip 174, and the reel seat 18. In some embodiments, both the fly rod assembly 168 and the fly reel assembly 170 are heated. In such embodiments, a battery may be disposed within a component of the fly rod assembly 168, for example, within a hollow portion of the lower grip 174 or within a hollow portion of the reel seat 18. The battery may be similar to the power source 52 as described herein and may be removably mounted or permanently mounted within the fly reel and rod assembly 166. In such embodiments, where the battery is disposed in the fly rod assembly 168, an electrical connection may be established between the heating elements in the fly reel assembly 170 and the battery through the reel foot 56.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A heated fishing reel configured to be attached to a fishing rod, the heated fishing reel comprising:
   a reel casing including a thumb bar, a finger bar, and a gear housing;

a spool for winding fishing line;
a handle rotatably attached to the reel casing adjacent to the gear housing for rotating the spool;
a side plate selectively attached to the reel casing;
one or more heating elements comprising:
   a first heating element disposed in the thumb bar of the reel casing for heating the thumb bar;
   a second heating element disposed in the finger bar of the reel casing for heating the finger bar;
   a third heating element disposed in the reel casing adjacent to the gear housing; and
   a fourth heating element disposed in the side plate for heating the side plate; and
a power source disposed in the side plate for providing power to the one or more heating elements.

2. The heated fishing reel of claim 1, wherein the heated fishing reel is a baitcasting-style fishing reel.

3. The heated fishing reel of claim 1, wherein the one or more heating elements further comprises a fifth heating element disposed in the handle for heating the handle.

4. The heated fishing reel of claim 3, further comprising a slip ring for providing power from the power source to the fifth heating element, wherein the slip ring is disposed adjacent to a bearing of the handle.

5. The heated fishing reel of claim 3, further comprising an additional power source disposed in the handle to provide power to the fifth heating element.

6. The heated fishing reel of claim 1, further comprising:
a line guide attached to the reel casing; and
a fifth heating element disposed adjacent to the line guide for heating the line guide.

7. The heated fishing reel of claim 1, wherein at least one heating element of the one or more heating elements is an electrically resistive heating element.

8. The heated fishing reel of claim 1, wherein at least one heating element of the one or more heating elements is a film heating element.

9. The heated fishing reel of claim 1, wherein at least one heating element of the one or more heating elements is a radiative heating element.

10. The heated fishing reel of claim 1, wherein the reel casing, the side plate, and an attachment therebetween are waterproof.

11. A system for heating a fishing reel, the system comprising:
a plurality of heating elements disposed in said fishing reel for heating said fishing reel,
wherein the fishing reel comprises a spool for winding fishing line, a reel casing attached to the spool, at least one reel foot attached to the reel casing, and a handle for rotating the spool,
wherein the plurality of heating elements comprises a first heating element disposed in the reel casing, a second heating element disposed in the at least one reel foot, and a third heating element disposed in the handle; and
a power source attached to the reel casing of said fishing reel,
wherein the power source provides power to the plurality of heating elements.

12. The system of claim 11, wherein the power source is a rechargeable battery and further comprising a charger for charging the rechargeable battery.

13. The system of claim 11, further comprising:
a controller for controlling the plurality of heating elements; and
at least one temperature sensor disposed in the reel casing for detecting a temperature of the reel casing.

14. The system of claim 13, wherein the power to the plurality of heating elements is automatically switched to an off state by the controller if the temperature detected by the at least one temperature sensor is above a threshold temperature.

15. The system of claim 13, further comprising:
a heat adjustment component,
wherein the heat adjustment component is configured to adjust at least one of a voltage and a current to the plurality of heating elements according to an operator input.

16. A heated handle assembly comprising:
a rocker arm configured to be rotatably attached to a reel casing,
wherein the rocker arm is configured to be coupled to a fishing reel;
at least one knob rotatably attached to a distal end of the rocker arm;
a heating element disposed in the at least one knob; and
a rechargeable power source mounted in the at least one knob,
wherein the power source is configured to provide power to the heating element.

17. The assembly of claim 16, wherein the at least one knob is removably attached to the rocker arm.

18. The assembly of claim 16, wherein the knob is a first knob, the distal end is a first distal end, the heating element is a first heating element, the rechargeable power source is a first rechargeable power source, and the handle is a double handle further comprising a second knob attached to a second distal end of the rocker arm, a second heating element disposed in the second knob, and a second rechargeable power source mounted in the second knob.

19. The assembly of claim 16, wherein the rechargeable power source is removably mounted in the at least one knob.

20. The assembly of claim 16, further comprising an additional heating element disposed in the rocker arm for heating the rocker arm.

* * * * *